(12) United States Patent
Sohn et al.

(10) Patent No.: US 10,104,321 B1
(45) Date of Patent: Oct. 16, 2018

(54) IMAGE PROCESSING SYSTEM AND METHOD FOR AN IMAGE SENSOR

(71) Applicant: Himax Imaging Limited, Tainan (TW)

(72) Inventors: Youngchul Sohn, Tainan (TW);
Kwangoh Kim, Tainan (TW); Hack soo Oh, Tainan (TW)

(73) Assignee: Himax Imaging Limited, Tainan (TW)

( * ) Notice: Subject to any disclaimer, the term of this patent is extended or adjusted under 35 U.S.C. 154(b) by 0 days.

(21) Appl. No.: 15/677,598

(22) Filed: Aug. 15, 2017

(51) Int. Cl.
| H04N 5/361 | (2011.01) |
| H04N 5/369 | (2011.01) |
| H04N 5/376 | (2011.01) |
| H04N 5/3745 | (2011.01) |
| H04N 5/355 | (2011.01) |

(52) U.S. Cl.
CPC ............. *H04N 5/361* (2013.01); *H04N 5/355* (2013.01); *H04N 5/3696* (2013.01); *H04N 5/3765* (2013.01); *H04N 5/37455* (2013.01)

(58) Field of Classification Search
CPC ...... H04N 5/3355; H04N 5/355; H04N 5/357; H04N 5/3745–5/37455; H04N 5/3696; H04N 5/378; H04N 5/3765; H03M 1/00–1/645
See application file for complete search history.

(56) References Cited

U.S. PATENT DOCUMENTS

| 6,791,607 | B1 * | 9/2004 | Bilhan | ............... H04N 5/18 348/243 |
| 7,817,197 | B2 * | 10/2010 | Noguchi | ........... H04N 5/372 348/241 |
| 8,553,114 | B2 * | 10/2013 | Uchida | ............. H04N 3/1568 348/294 |
| 9,350,927 | B2 * | 5/2016 | Luo | ................. H04N 5/361 |
| 2009/0002527 | A1 * | 1/2009 | Higuchi | .......... H03M 1/0604 348/243 |
| 2011/0090238 | A1 * | 4/2011 | Dong | ............... H04N 5/335 345/589 |
| 2014/0146210 | A1 * | 5/2014 | Lee | ................. H04N 5/378 348/302 |

\* cited by examiner

*Primary Examiner* — Lin Ye
*Assistant Examiner* — Chriss Yoder, III
(74) *Attorney, Agent, or Firm* — Donald E. Stout; Stout, Uxa & Buyan, LLP (57) ABSTRACT

An image processing system for an image sensor includes an analog-to-digital conversion (ADC) unit that performs ADC on pixel signals, thereby generating digital pixel signals; a correlated double sampling (CDS) unit that performs CDS on the digital pixel signals; a black level estimation (BLE) unit that generates a negative offset voltage according to dark voltage obtained from CDS performed on estimating optical black pixels (OBPs) of a pixel array, the negative offset voltage being subtracted from the pixel signals before feeding the pixel signals to the ADC unit; and a black level compensation (BLC) unit that performs BLC on active pixels sensors (APSs) and the compensating OBPs of the pixel array.

20 Claims, 10 Drawing Sheets

IMAGE PROCESSING SYSTEM AND METHOD FOR AN IMAGE SENSOR

BACKGROUND OF THE INVENTION

1. Field of the Invention

The present invention generally relates to an image sensor, and more particularly to a column-parallel image sensor with improved signal-chain dynamic range.

2. Description of Related Art

An image sensor, such as a complementary metal-oxide-semiconductor (CMOS) image sensor, is a device that converts an optical image into electronic signals. The image sensor has been widely used in a variety of applications such as cell phones and cameras. The CMOS image sensor may be applied to other stringent applications such as automotive and security.

Dark current, however, flows through the photodiode of the CMOS image sensor even when no outside radiation is entering the photodiode. As dark current increases exponentially with the increase of temperature, it becomes a significant source for noise in the image sensor at high temperature, for example, higher than 60° C. As a result, the output image is saturated and cannot be recognized even conventional black level compensation scheme has been adopted.

For the reasons that conventional image sensors could not function effectively at high temperature, a need has arisen to propose a novel image sensor with improved dynamic range in the signal chain, particularly at high temperature.

SUMMARY OF THE INVENTION

In view of the foregoing, it is an object of the embodiment of the present invention to provide an image sensor, of which signal-chain dynamic range can be substantially improved at high temperature based on black level estimation.

According to one embodiment, an image processing system for an image sensor includes a pixel array, an analog-to-digital conversion (ADC) unit, a correlated double sampling (CDS) unit, a black level estimation (BLE) unit, and a black level compensation (BLC) unit. The pixel array provides pixel signals, the pixel array including active pixels sensors (APSs), compensating optical black pixels (OBPs) and estimating OBPs. The ADC unit performs analog-to-digital conversion on the pixel signals, thereby generating digital pixel signals. The CDS unit performs correlated double sampling on the digital pixel signals. The BLE unit generates a negative offset voltage according to dark voltage obtained from correlated double sampling performed on the estimating OBPs, the negative offset voltage being subtracted from the pixel signals before feeding the pixel signals to the ADC unit. The BLC performs black level compensation on the APSs and the compensating OBPs.

DETAILED DESCRIPTION OF THE INVENTION

Figure 1:
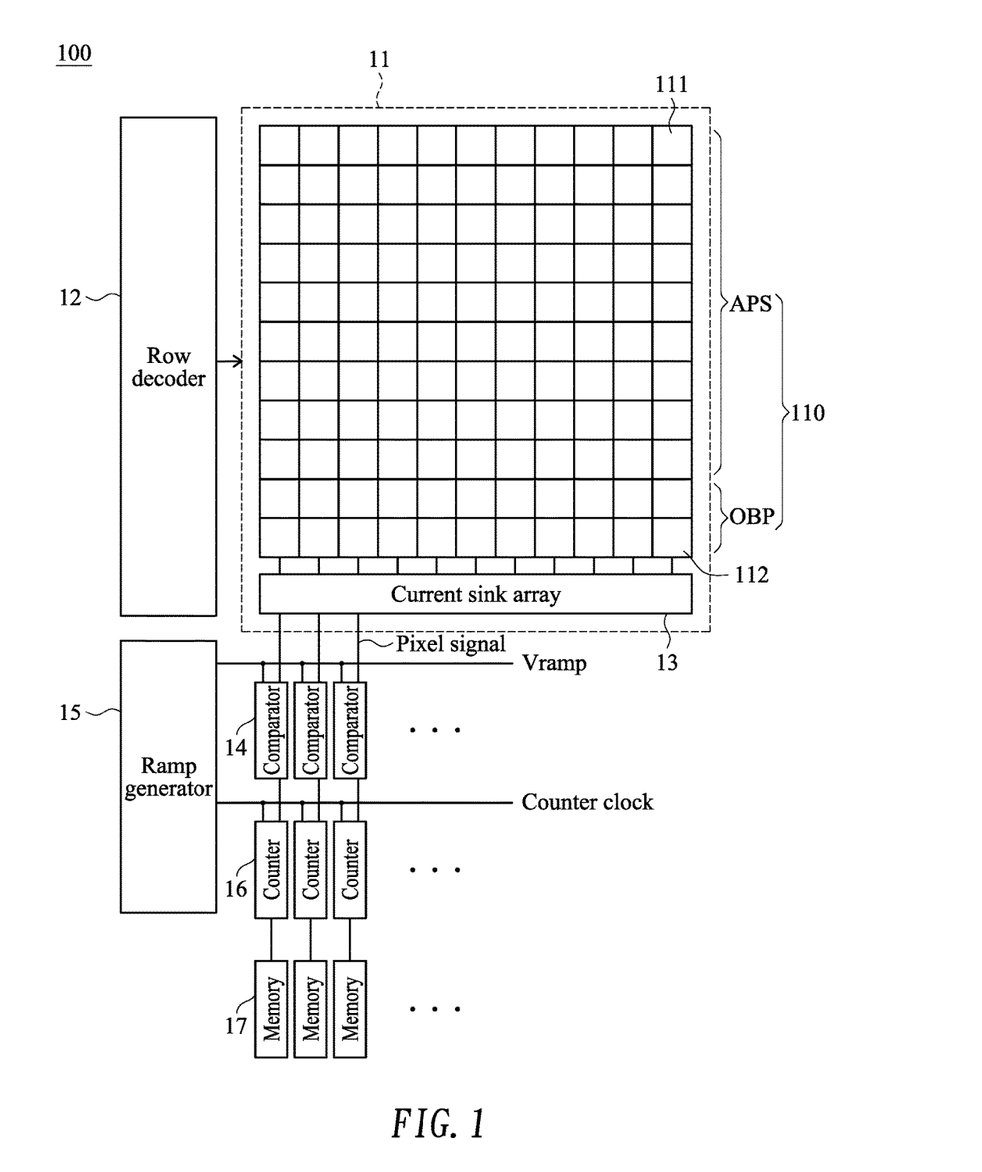
FIG. 1 shows a block diagram illustrated of a column-parallel image sensor.

FIG. 1 shows a block diagram illustrated of a column-parallel image sensor 100, for example, a complementary metal-oxide-semiconductor (CMOS) image sensor. The image sensor 100 may include a pixel array 11 composed of a plurality of pixels 110 arranged in rows and columns. Specifically, the pixel array 11 may include a plurality of active pixel sensors (APSs) 111 and a plurality of optical black pixels (OBPs) 112. The APSs 111 are configured to receive incident light, while the OBPs 112 are blocked from receiving incident light. The OBPs 112 are utilized for black level compensation (BLC), which will be described in details later in this specification.

Figure 2:
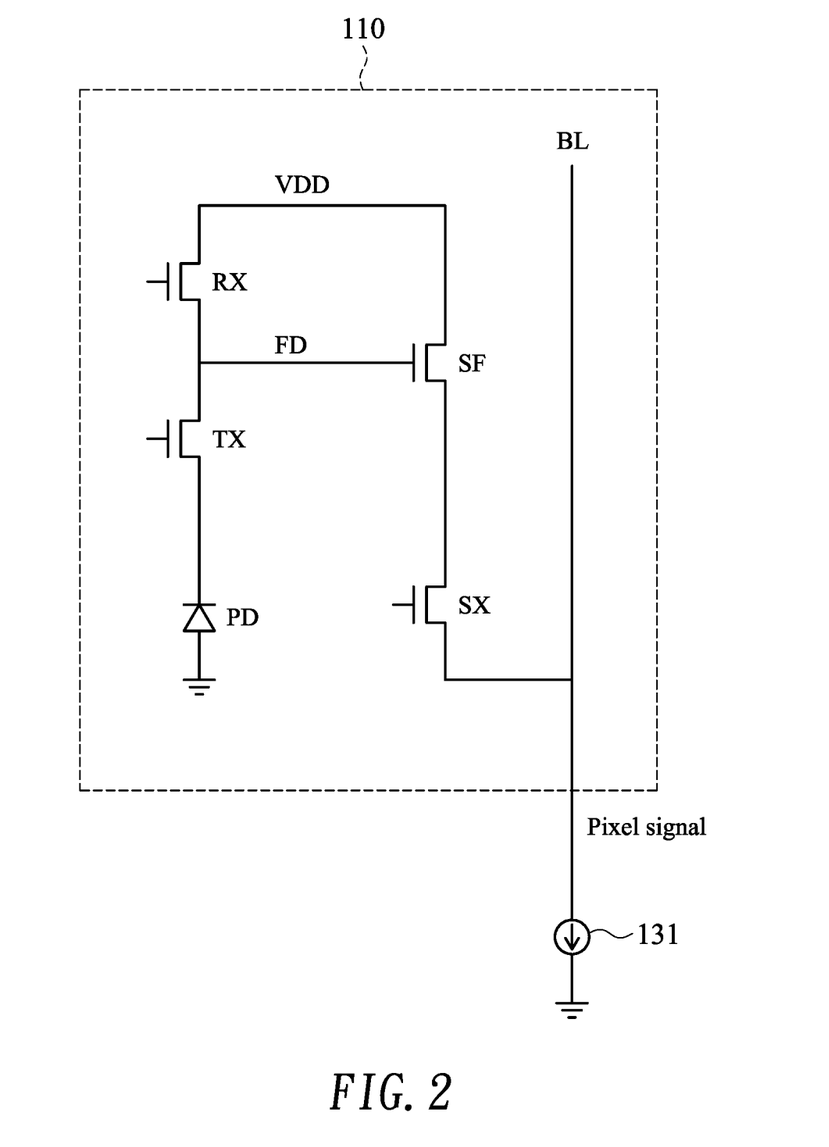
FIG. 2 shows a circuit diagram exemplifying the pixel of FIG. 1.

FIG. 2 shows a circuit diagram exemplifying the pixel 110 of FIG. 1. The pixel 110 may include a photodiode PD, a reset transistor RX, a transfer transistor TX, a source follower transistor SF, and a select transistor SX connected as shown in a 4-transistor (4T) architecture. When the reset transistor RX is turned on, a reset voltage is defined at a floating diffusing (FD) node by a power voltage VDD minus a voltage drop across the reset transistor RX. When the transfer transistor TX is turned on, a light signal integrated by the photodiode PD may then be transferred via the FD node. The source follower SF may be activated to buffer or amplify the light signal of the photodiode PD. When the select transistor SX is turned on, a pixel signal may then be read out from the pixel array 11 via a bit line BL.

Referring back to FIG. 1, the pixel array 11 of the image sensor 100 may include a current sink array 13 that may include a plurality of current sink circuits 131 respectively coupled to output nodes of the select transistors SX as exemplified in FIG. 2. Specifically, the current sink circuit 131, such as a current source, is coupled between the output node of the select transistor SX and ground, and is used as a biasing circuit configured to sink a current from the output node of the select transistor SX.

The image sensor 100 may include a row decoder 12 that is configured to select one row of the pixel array 11 at a time such that the pixel signals of the selected row may then be read out.

The image sensor 100 of FIG. 1 may adopt single-slope column-parallel analog-to-digital conversion (ADC) scheme for converting the pixel signals from analog form into digital form. Specifically, the ADC scheme may include a set of comparators 14, each of which is coupled to receive a corresponding pixel signal from the pixel array 11 and a ramp signal Vramp generated by a ramp generator 15. The ADC scheme may include a set of counters 16 that are coupled to receive compare results of the comparators 14, respectively. The counters 16 also receive a counter clock. The ADC scheme may further include a set of memory devices 17 that are coupled to receive counting values of the counters 16, respectively. The data stored in the memory devices 17 may be processed by a digital image processor (not shown) to accordingly generate a digital image output. The comparator 14, the counter 16 and the memory device 17, among others, primarily construct a pixel readout circuit of the signal chain of the image sensor 100.

Figure 3:
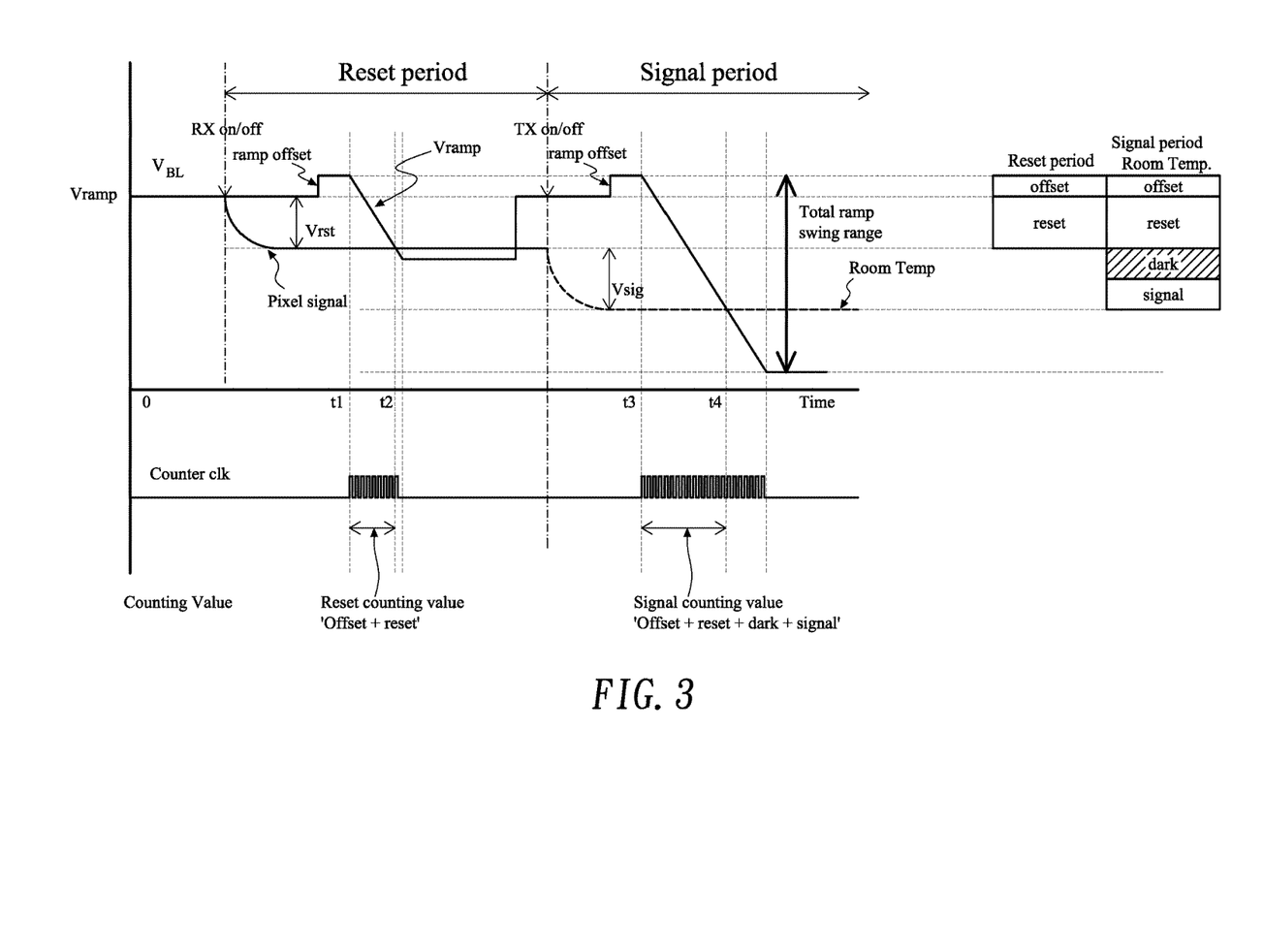
FIG. 3 shows an exemplary timing diagram illustrated of correlated double sampling (CDS) performed in the image sensor of FIG. 1.

FIG. 3 shows an exemplary timing diagram illustrated of correlated double sampling (CDS) performed in the image sensor 100 of FIG. 1. In a reset period, a reset voltage Vrst at the FD node (FIG. 2) is sampled and fed to a corresponding comparator 16. When the ramp signal Vramp starts ramping at time t1, the counter 16 begins counting. When the comparator 15 detects a crossover point (at time t2) at which the ramp signal Vramp is equal to the pixel signal, the counter 16 stops counting. It is noted that the counting value in the reset period includes (comparator-related) offset voltage and the reset voltage Vrst. It is observed that the reset voltage Vrst is represented by a negative quantity.

In a signal period, a light signal Vsig of the photodiode PD plus the reset voltage Vrst at the FD node is sampled and fed to a corresponding comparator 16. It is observed that the light signal Vsig is represented by a negative quantity. When the ramp signal Vramp starts ramping at time t3, the counter 16 begins counting. When the comparator 15 detects a crossover point (at time t4) at which the ramp signal Vramp is equal to the pixel signal, the counter 16 stops counting. It is noted that the counting value in the signal period includes offset voltage and reset voltage Vrst as in the reset period, and further includes the light signal Vsig corrupted with a dark voltage caused by dark electrons (or dark current) of the photodiode PD.

Figure 4:
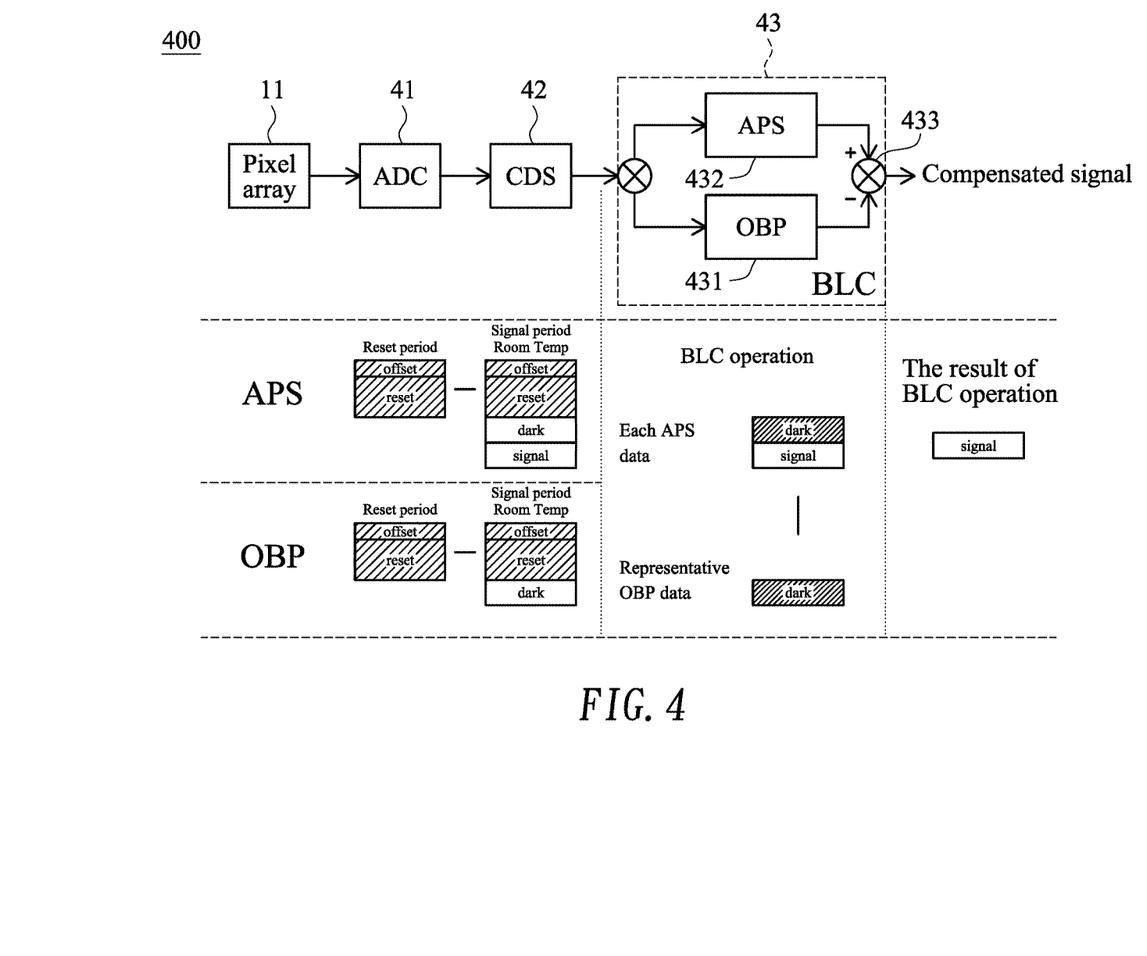
FIG. 4 shows a block diagram illustrated of an image processing system for an image sensor.

FIG. 4 shows a block diagram illustrated of an image processing system 400 for an image sensor such as a CMOS image sensor. The image processing system 400 (system 400 hereinafter) may include an ADC unit 41 that is configured to perform analog-to-digital conversion on pixel signals received from a pixel array 11. The system 400 may include a CDS unit 42 that is configured to perform correlated double sampling (e.g., digital correlated double sampling or DDS) on digital pixel signals generated by the ADC unit 41, thereby removing unwanted offset voltage and reset voltage to result in a correlated pixel signal. The system 400 may further include a black level compensation (BLC) unit 43 that is configured to remove unwanted dark voltage, thereby resulting in a compensated pixel signal. In an alternative system, the CDS unit 42 precedes the ADC unit 41 in a manner that (analog) correlated double sampling is performed on the pixel signal before executing analog-to-digital conversion.

Specifically speaking, the optical black pixels (OBPs) 112 (FIG. 1) of the pixel array 11 are firstly processed by the ADC unit 41 in the reset period, therefore resulting in a first digital pixel signal composed of offset voltage and reset voltage. Afterwards, the OBPs 112 are processed by the ADC unit 41 in the signal period, therefore resulting in a second digital pixel signal composed of offset voltage, reset voltage and dark voltage. The first digital pixel signal is subtracted from the second digital pixel signal in the CDS unit 42, therefore resulting in the dark voltage (containing no offset voltage and reset voltage). The resultant dark voltage is then stored temporarily in an OBP sub-unit 431 of the BLC unit 43.

Similarly, the active pixel sensors (APSs) 111 (FIG. 1) of the pixel array 11 are processed by the ADC unit 41 in the reset period, therefore resulting in a third digital pixel signal composed of offset voltage and reset voltage. Afterwards, the APSs 111 are processed by the ADC unit 41 in the signal period, therefore resulting in a fourth digital pixel signal composed of offset voltage, reset voltage, dark voltage and light signal. The third digital pixel signal is subtracted from the fourth digital pixel signal in the CDS unit 42, therefore resulting in the dark voltage plus the light signal (containing no offset voltage and reset voltage). The resultant dark voltage plus the light signal is then stored temporarily in an APS sub-unit 432 of the BLC unit 43

Finally, the dark voltage plus the light signal stored in the APS sub-unit 432 subtracts the dark voltage stored in the OBP sub-unit 431 by a subtractor 433 of the BLC unit 43, therefore resulting in the compensated pixel signal without being corrupted by the dark voltage. The black level compensation may be expressed as follows:

$$(\text{`dark+signal'})_{APS} - (\text{`dark'})_{OBP} = \text{signal}$$

Accordingly, a compensated pixel signal of black color has a value substantially near digital zero. On the contrary, without being subject to black level compensation, a correlated pixel signal of black color may probably look gray. The dark current in the photodiode PD, however, increases exponentially with the increase of temperature.

Figure 5:
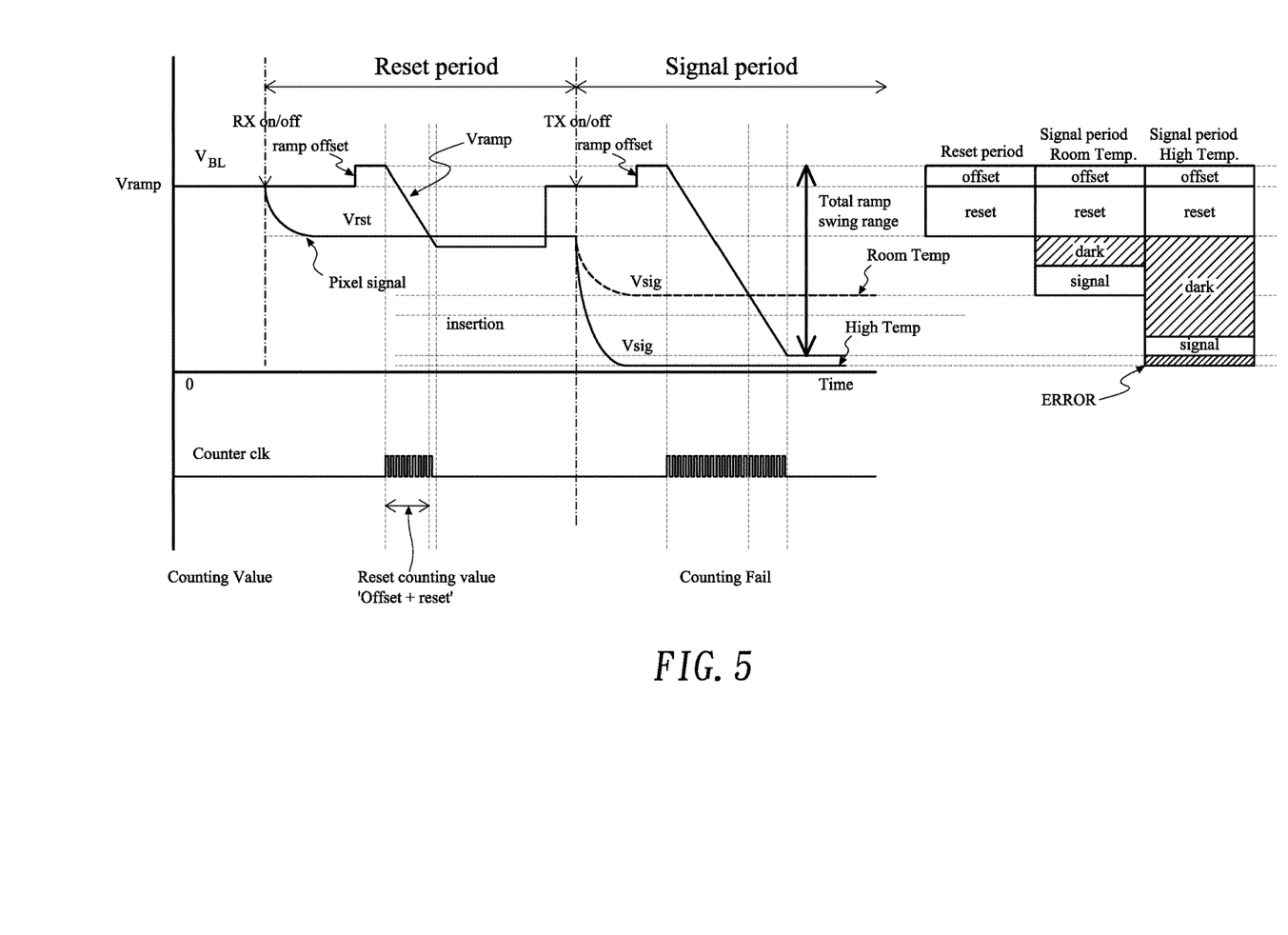
FIG. 5 shows another timing diagram illustrated of correlated double sampling (CDS) performed in the image sensor of FIG. 1.

FIG. 5 shows another timing diagram illustrated of correlated double sampling (CDS) performed in the image sensor 100 of FIG. 1. It is observed that, at high temperature, the comparator 15 may never detect a crossover point between the ramp signal Vramp and the pixel signal, and the counter 16 may overflow. Moreover, the OBP sub-unit 431 and the APS sub-unit 432 require more storage area or more bits with the increase of temperature. In order to overcome the drawbacks of the system 400, a novel system has been proposed.

Figure 6:
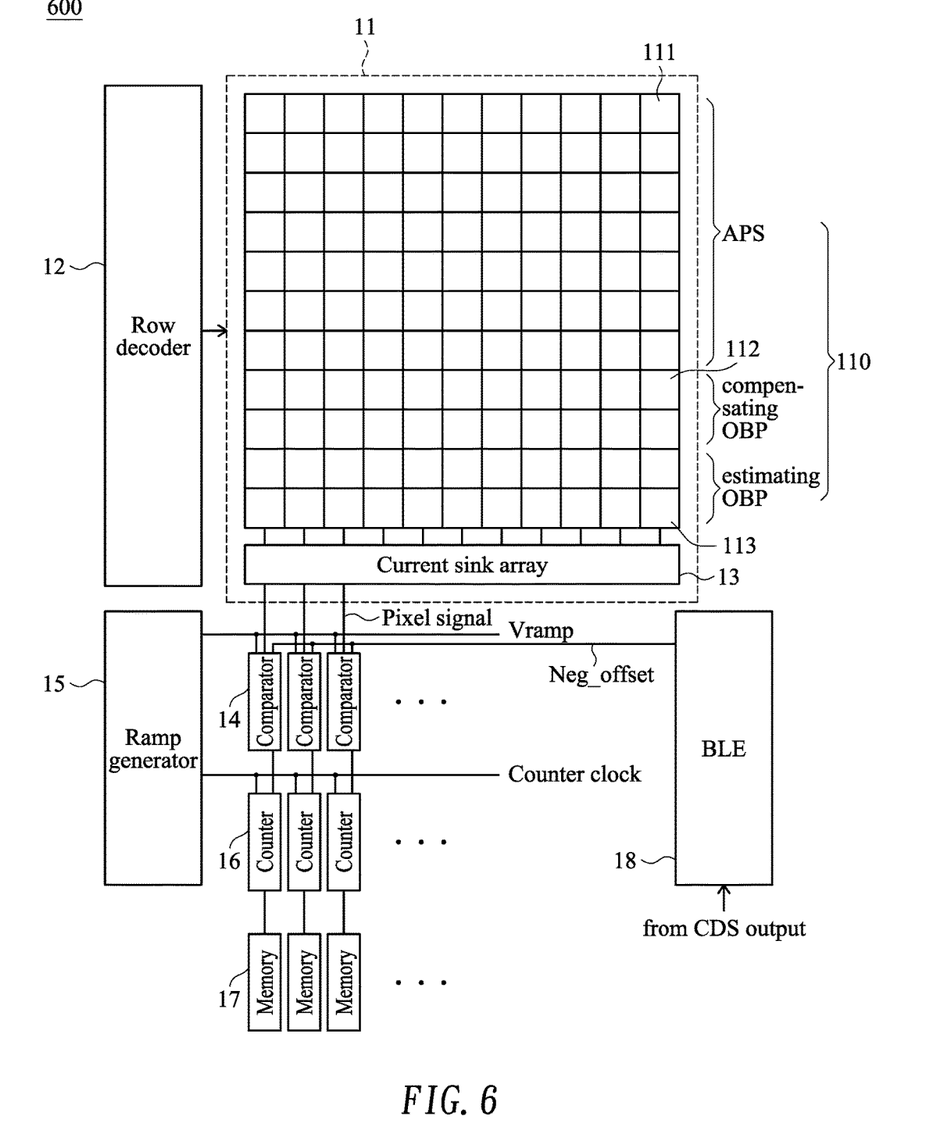
FIG. 6 shows a block diagram illustrated of a column-parallel image sensor according to one embodiment of the present invention.

FIG. 6 shows a block diagram illustrated of a column-parallel image sensor 600 (e.g., a CMOS image sensor) according to one embodiment of the present invention. The image sensor 600 may include a pixel array 11 composed of a plurality of pixels 110 arranged in rows and columns. In the embodiment, the pixel array 11 may include a plurality of active pixel sensors (APSs) 111, a plurality of compensating optical black pixels (OBPs) 112, and a plurality of estimating OBPs 113. The APSs 111 are configured to receive incident light, while the compensating OBPs 112 and the estimating OBPs 113 are blocked from receiving incident light. The compensating OBPs 112 are utilized for black level compensation (BLC) as explained above, and the estimating OBPs 113 are utilized for black level estimation (BLE) which will be described in details later in this specification.

Similar to FIG. 1, the image sensor 600 may include a row decoder 12 that is configured to select one row of the pixel array 11 at a time such that the pixel signals of the selected row may then be read out. The pixel array 11 of the image sensor 600 may also include a current sink array 13 that may include a plurality of current sink circuits 131 respectively coupled to an outputs of the select transistors SX as exemplified in FIG. 2. Specifically, the current sink circuit 131, such as a current source, is coupled between the output of the select transistor SX and ground, and is used as a biasing circuit configured to sink a current from the output of the select transistor SX.

The image sensor 600 of the embodiment may adopt single-slope column-parallel analog-to-digital conversion (ADC) scheme for converting the pixel signals from analog form into digital form. Specifically, the ADC scheme may include a set of comparators 14, each of which is coupled to receive a corresponding pixel signal from the pixel array 11 and a ramp signal Vramp generated by a ramp generator 15. The ADC scheme may include a set of counters 16 that are coupled to receive compare results of the comparators 14, respectively. The counters 16 also receive a counter clock. The ADC scheme may include a set of memory devices 17 that are coupled to receive counting values of the counters 16, respectively. The data stored in the memory devices 17 may be processed by a digital image processor (not shown) to accordingly generate a digital image output.

According to one aspect of the embodiment, the image sensor 600 may include a black level estimation (BLE) unit 18 that is configured to generate a negative offset voltage Neg_offset according to an output of correlated double sampling (CDS), for example, digital correlated double sampling (DDS), performed on the estimating OBPs 113 (by a DDS unit). The negative offset voltage Neg_offset is fed to the comparators 14 for counteracting dark voltage of the pixel signals.

Figure 7:
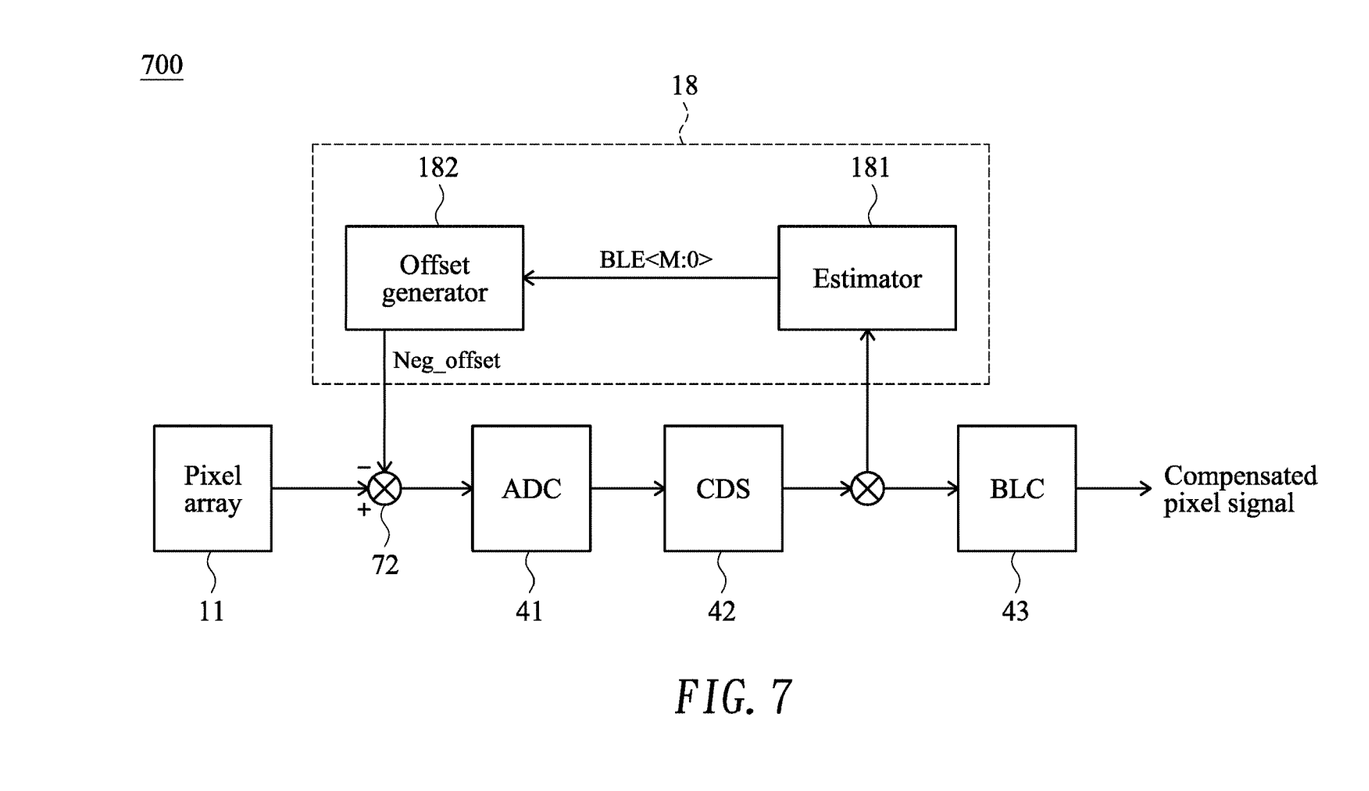
FIG. 7 shows a block diagram illustrated of an image processing system for an image sensor according to one embodiment of the present invention.

FIG. 7 shows a block diagram illustrated of an image processing system 700 for an image sensor such as a CMOS image sensor according to one embodiment of the present invention. The blocks shown in FIG. 7 may be implemented by hardware (e.g., circuitry) or software (e.g., performed in a digital signal processor). Details of the blocks 11, 41, 42 and 43 having been discussed in FIG. 4 are omitted for brevity. In the embodiment, the image processing system 700 (system 700 hereinafter) may include a black level estimation (BLE) unit 18 that is coupled to receive an output of the CDS unit 42, according to which a negative offset voltage Neg_offset is generated. The generated negative offset voltage Neg_offset is subtracted from the pixel signal (out of the pixel array 11) by a subtractor 72, and an output of the subtractor 72 is then fed to the ADC unit 41.

Specifically, the BLE unit 18 of the embodiment may include an estimator 181 and an offset generator 182. In the embodiment, the estimator 181 is a digital circuit or program, and the offset generator 182 is an analog circuit. The estimator 181 is coupled to receive dark voltage obtained from correlated double sampling (CDS) performed on the estimating OBPs 113, which may be expressed as follows:

BLE:(offset+reset+dark)−(offset+reset)=dark

If the estimator 181 determines that the dark voltage is greater than a predetermined threshold, the estimator 181 activates the offset generator 182 by an offset control signal BLE<M:0> in order to generate the (analog) negative offset voltage Neg_offset for use to perform black level compensation on the compensating OBPs 112 and the APSs 111. Accordingly, the dark voltage in the compensating OBPs 112 and the APSs 111 are substantively counteracted by the amount of Neg_offset. It is appreciated that the generated negative offset voltage Neg_offset may be used for performing black level compensation on a current and succeeding row or rows of the APSs 111. The BLC unit 43 performs black level compensation as follows:

OBP:(offset+rest+dark−Neg_offset)−(offset+reset)
=dark−Neg_offset

APS:(offset+reset+dark+signal−Neg_offset)−(offset+reset)=dark+signal−Neg_offset

BLC:(dark+signal−Neg_offset)$_{APS}$−(dark−Neg_offset)$_{OBP}$=signal

Figure 8:
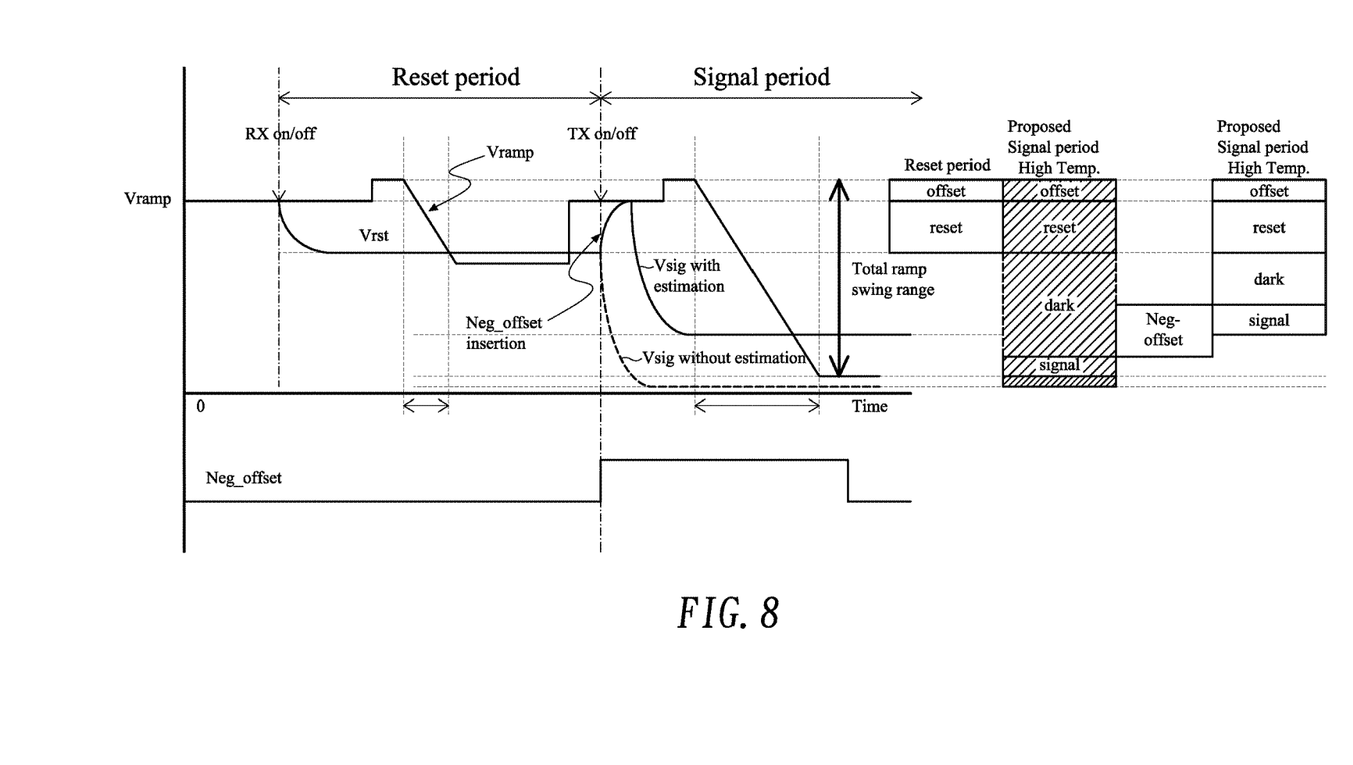
FIG. 8 shows an exemplary timing diagram illustrated of correlated double sampling (CDS) performed in the image sensor of FIG. 6.

FIG. 8 shows an exemplary timing diagram illustrated of correlated double sampling (CDS) performed in the image sensor 600 of FIG. 6. It is observed that, at high temperature, the dark voltage is substantively counteracted by the negative offset voltage Neg_offset. It is noted that the negative offset voltage Neg_offset is represented by a positive quantity, which is opposite to the light signal Vsig represented by a negative quantity. Accordingly, the comparator 15 may properly detect a crossover point between the ramp signal Vramp and the pixel signal without overflowing the counter 16. Therefore, storage area or bit number of the OBP sub-unit 431 and the APS sub-unit 432 can be reduced and dynamic range of signal chain can be substantially improved at high temperature.

Figure 9:
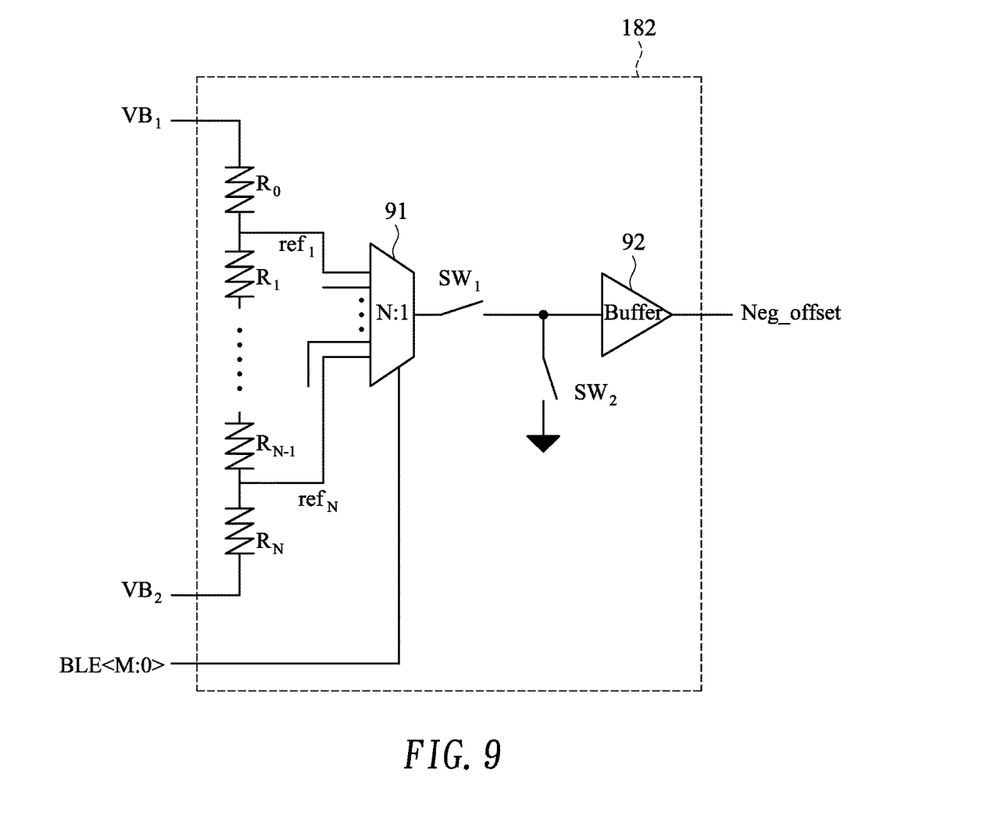
FIG. 9 shows an exemplary circuit diagram illustrated of the offset generator of FIG. 7.

FIG. 9 shows an exemplary circuit diagram illustrated of the offset generator 182 of FIG. 7. In the embodiment, the offset generator 182 may include a voltage divider composed of a resistor array $R_0$ to $R_N$. The voltage divider distributes input voltage $VB_1$-$VB_2$ among the resistors $R_0$ to $R_N$, therefore generating reference voltages $ref_1$ to $ref_N$. The offset generator 182 may include a multiplexer 91 that is coupled to receive the reference voltages $ref_1$ to $ref_N$. The multiplexer 91 selects one of the reference voltages $ref_1$ to $ref_N$ as an output according to selection bits of the offset control signal BLE<M:0>.

The offset generator 182 may include a first switch $SW_1$ and a second switch $SW_2$. The first switch $SW_1$ is connected between the output of the multiplexer 91 and an input of a buffer 92. The second switch $SW_2$ has a first end connected to an input of the buffer, and a second end connected to ground. When performing BLC on the estimating OBPs 113, the first switch $SW_1$ is closed and the second switch $SW_2$ is open, and therefore the multiplexer 91 outputs the selected reference voltage which passes through the buffer 92 as the negative offset voltage Neg_offset. Otherwise, the first switch $SW_1$ is open and the second switch $SW_2$ is closed, and therefore the buffer 92 does not generate any negative offset voltage.

Figure 10A:
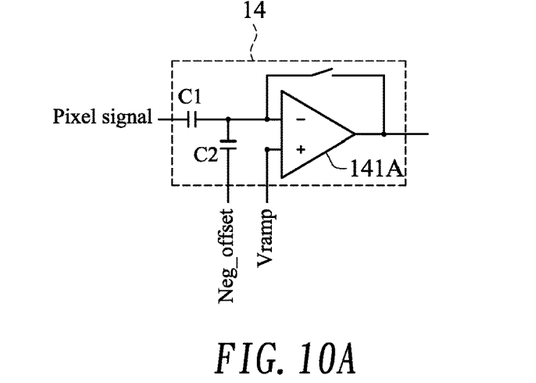
FIG. 10A shows an exemplary circuit diagram illustrated of the comparator of FIG. 6.
Figure 10B:
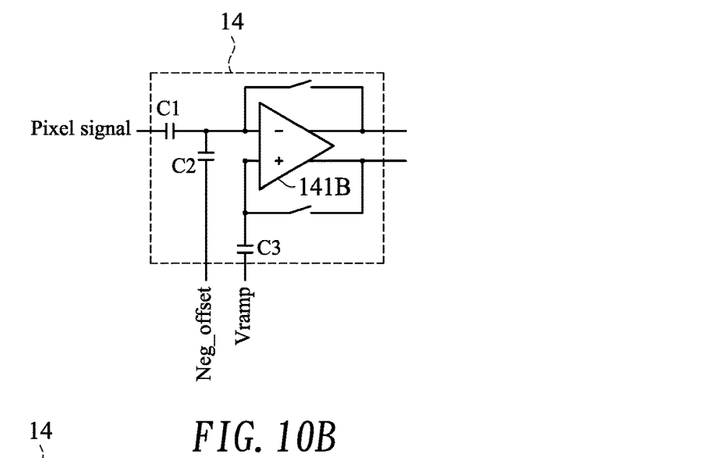
FIG. 10B shows another exemplary circuit diagram illustrated of the comparator of FIG. 6.
Figure 10C:
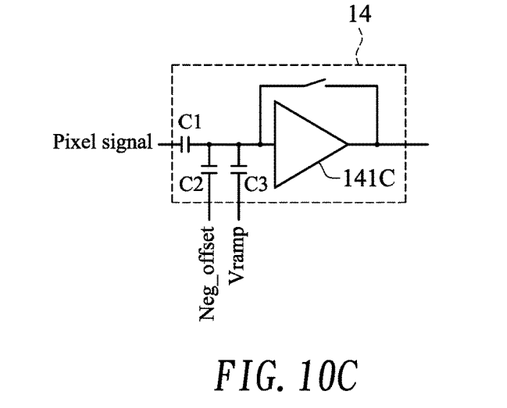
FIG. 10C shows a further exemplary circuit diagram illustrated of the comparator of FIG. 6.

FIG. 10A shows an exemplary circuit diagram illustrated of the comparator 14 of FIG. 6. The comparator 14 may include a differential to single-ended amplifier 141A such as an operational amplifier. The pixel signal and the negative offset voltage Neg_offset are connected to a non-inverting input of the amplifier 141A via a first capacitor C1 and a second capacitor C2, respectively. The ramp signal Vramp is connected to an inverting input of the amplifier 141A. FIG. 10B shows another exemplary circuit diagram illustrated of the comparator 14 of FIG. 6. The comparator 14 may include a differential to differential amplifier 141B such as an operational amplifier. The pixel signal and the negative offset voltage Neg_offset are connected to a non-inverting input of the amplifier 141B via a first capacitor C1 and a second capacitor C2, respectively. The ramp signal Vramp is connected to an inverting input of the amplifier 141B via a third capacitor C3. FIG. 10C shows a further exemplary circuit diagram illustrated of the comparator 14 of FIG. 6. The comparator 14 may include a single-input to single-output amplifier 141C such as an operational amplifier. The pixel signal, the negative offset voltage Neg_offset and the ramp signal Vramp are connected to an input of the amplifier 141C via a first capacitor C1, a second capacitor C2 and a third capacitor C3, respectively.

Although specific embodiments have been illustrated and described, it will be appreciated by those skilled in the art that various modifications may be made without departing from the scope of the present invention, which is intended to be limited solely by the appended claims.

What is claimed is:

1. An image processing system for an image sensor, comprising:
    a pixel array that provides pixel signals, the pixel array including active pixels sensors (APSs), compensating optical black pixels (OBPs) and estimating OBPs;
    an analog-to-digital conversion (ADC) unit that performs analog-to-digital conversion on the pixel signals, thereby generating digital pixel signals;
    a correlated double sampling (CDS) unit that performs correlated double sampling on the digital pixel signals;
    a black level estimation (BLE) unit that generates a negative offset voltage according to dark voltage obtained from correlated double sampling performed on the estimating OBPs, the negative offset voltage being subtracted from the pixel signals before feeding the pixel signals to the ADC unit; and
    a black level compensation (BLC) unit that performs black level compensation on the APSs and the compensating OBPs.

2. The system of claim 1, wherein the pixel array comprises a current sink array that includes a plurality of current sink circuits coupled to output nodes of the pixel signals, respectively.

3. The system of claim 1, further comprising a row decoder that selects one row of the pixel array at a time such that the pixel signals of the selected row may then be read out.

4. The system of claim 1, wherein the ADC unit comprises:
    a ramp generator that generates a ramp signal;
    a set of comparators, each of which is coupled to receive a corresponding pixel signal from the pixel array, the ramp signal and the negative offset voltage; and
    a set of counters, each of which is coupled to receive a counter clock and a compare result of a corresponding comparator.

5. The system of claim 4, wherein the ADC unit further comprises a set of memory devices that are coupled to receive counting values of the counters, respectively.

6. The system of claim 4, wherein the comparator comprises:
    a differential to single-ended amplifier;
    a first capacitor via which the pixel signal is connected to a non-inverting input of the amplifier; and
    a second capacitor via which the negative offset voltage is connected to the non-inverting input of the amplifier;
    wherein the ramp signal is connected to an inverting input of the amplifier.

7. The system of claim 4, wherein the comparator comprises:
    a differential to differential amplifier;
    a first capacitor via which the pixel signal is connected to a non-inverting input of the amplifier;
    a second capacitor via which the negative offset voltage is connected to the non-inverting input of the amplifier; and
    a third capacitor via which the ramp signal is connected to an inverting input of the amplifier.

8. The system of claim 4, wherein the comparator comprises:
    a single-input to single-output amplifier;
    a first capacitor via which the pixel signal is connected to an input of the amplifier;
    a second capacitor via which the negative offset voltage is connected to the input of the amplifier; and
    a third capacitor via which the ramp signal is connected to the input of the amplifier.

9. The system of claim 1, wherein the BLC unit comprises an OBP sub-unit and an APS sub-unit, wherein the compensating OBPs are processed by the ADC unit in a reset period, thereby resulting in a first digital pixel composed of offset voltage and reset voltage; the compensating OBPs are processed by the ADC unit in a signal period, thereby resulting in a second digital pixel signal composed of the offset voltage, the reset voltage and the dark voltage; the first digital pixel signal is subtracted from the second digital pixel signal in the CDS unit, thereby resulting in the dark voltage which is stored temporarily in the OBP sub-unit; the APSs are processed by the ADC unit in the reset period, thereby resulting in a third digital pixel signal composed of the offset voltage and the reset voltage; the APSs are processed by the ADC unit in the signal period, thereby resulting in a fourth digital pixel signal composed of the offset voltage, the reset voltage, the dark voltage and light signal; the third digital pixel signal is subtracted from the fourth digital pixel signal in the CDS unit, thereby resulting in the dark voltage plus the light signal which is stored temporarily in the APS sub-unit; the dark voltage plus the light signal stored in the APS sub-unit subtracts the dark voltage stored in the OBP sub-unit, thereby resulting in the light signal as a compensated pixel signal.

10. The system of claim 1, wherein the CDS unit comprises a digital correlated double sampling (DDS) unit.

11. The system of claim 1, wherein the BLE unit comprises:
    an estimator that is coupled to receive the dark voltage obtained from correlated double sampling performed on the estimating OBPs; and
    an offset generator that is activated by an offset control signal from the estimator when the dark voltage received by the estimator is greater than a predetermined threshold.

12. The system of claim 11, wherein the offset generator comprises:
    a voltage divider that generates a plurality of reference voltages; and
    a multiplexer that selects one of the reference voltages as an output according to the offset control signal.

13. The system of claim 12, wherein the offset generator further comprises:
    a buffer;
    a first switch that is connected between the output of the multiplexer and an input of the buffer; and
    a second switch that is connected between the input of buffer and ground;
    wherein the first switch is closed and the second switch is open when performing black level compensation on the estimating OBPs; otherwise the first switch is open and the second switch is closed.

14. An image processing system for an image sensor, comprising:
    a pixel array that provides pixel signals, the pixel array including active pixels sensors (APSs), compensating optical black pixels (OBPs) and estimating OBPs;
    a correlated double sampling (CDS) unit that performs correlated double sampling on the pixel signals;
    a black level estimation (BLE) unit that generates a negative offset voltage according to dark voltage obtained from correlated double sampling performed on the estimating OBPs, the negative offset voltage being subtracted from the pixel signals before subjecting the pixel signals to correlated double sampling; and a black level compensation (BLC) unit that performs black level compensation on the APSs and the compensating OBPs.

15. The system of claim 14, wherein the BLE unit comprises:
   an estimator that is coupled to receive the dark voltage obtained from correlated double sampling performed on the estimating OBPs; and
   an offset generator that is activated by an offset control signal from the estimator when the dark voltage received by the estimator is greater than a predetermined threshold.

16. The system of claim 15, wherein the offset generator comprises:
   a voltage divider that generates a plurality of reference voltages; and
   a multiplexer that selects one of the reference voltages as an output according to the offset control signal.

17. The system of claim 16, wherein the offset generator further comprises:
   a buffer;
   a first switch that is connected between the output of the multiplexer and an input of the buffer; and
   a second switch that is connected between the input of buffer and ground;
   wherein the first switch is closed and the second switch is open when performing black level compensation on the estimating OBPs; otherwise the first switch is open and the second switch is closed.

18. An image processing method for an image sensor, comprising:
   providing pixel signals by a pixel array, the pixel array including active pixels sensors (APSs), compensating optical black pixels (OBPs) and estimating OBPs;
   performing analog-to-digital conversion (ADC) on the pixel signals, thereby generating digital pixel signals;
   performing correlated double sampling (CDS) on the digital pixel signals;
   performing black level estimation (BLE) to generate a negative offset voltage according to dark voltage obtained from correlated double sampling performed on the estimating OBPs, the negative offset voltage being subtracted from the pixel signals before subjecting the pixel signals to ADC; and
   performing black level compensation (BLC) on the APSs and the compensating OBPs.

19. The method of claim 18, wherein the BLC step comprises:
   performing ADC on the compensating OBPs in a reset period, thereby resulting in a first digital pixel composed of offset voltage and reset voltage;
   performing ADC on the compensating OBPs in a signal period, thereby resulting in a second digital pixel signal composed of the offset voltage, the reset voltage and the dark voltage;
   subtracting the first digital pixel signal from the second digital pixel signal by performing CDS, thereby resulting in the dark voltage which is then temporarily stored;
   performing ADC on the APSs in the reset period, thereby resulting in a third digital pixel signal composed of the offset voltage and the reset voltage;
   performing ADC on the APSs in the signal period, thereby resulting in a fourth digital pixel signal composed of the offset voltage, the reset voltage, the dark voltage and light signal;
   subtracting the third digital pixel signal from the fourth digital pixel signal by performing CDS, thereby resulting in the dark voltage plus the light signal which is then temporarily stored; and
   subtracting the stored dark voltage from the stored dark voltage plus the light signal, thereby resulting in the light signal as a compensated pixel signal.

20. The method of claim 18, wherein the BLE step comprises:
   receiving the dark voltage obtained from correlated double sampling performed on the estimating OBPs; and
   generating an offset control signal, according to which the negative offset voltage is generated, when the received dark voltage is greater than a predetermined threshold.

* * * * *